(12) United States Patent
Koyasu et al.

(10) Patent No.: US 8,225,415 B2
(45) Date of Patent: Jul. 17, 2012

(54) CONTENT DISTRIBUTION SYSTEM, TERMINAL, AND SERVER

(75) Inventors: Takehiko Koyasu, Tokyo (JP); Atsushi Kohno, Tokyo (JP); Kimihiko Izaki, Tokyo (JP); Nori Matsuda, Tokyo (JP); Tatsuya Tsurukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1148 days.

(21) Appl. No.: 11/992,604

(22) PCT Filed: Aug. 24, 2006

(86) PCT No.: PCT/JP2006/316623
§ 371 (c)(1),
(2), (4) Date: Mar. 26, 2008

(87) PCT Pub. No.: WO2007/074557
PCT Pub. Date: Jul. 5, 2007

(65) Prior Publication Data
US 2009/0265539 A1    Oct. 22, 2009

(30) Foreign Application Priority Data
Dec. 26, 2005 (JP) ................. 2005-372721

(51) Int. Cl.
*G06F 7/04* (2006.01)
*H04L 9/08* (2006.01)
*G06F 9/445* (2006.01)

(52) U.S. Cl. ........... 726/27; 726/28; 726/30; 705/51; 705/59; 713/150; 713/170; 713/171; 380/277; 380/278

(58) Field of Classification Search ............ 726/26, 726/27, 30; 380/277, 278, 281–285; 717/174, 717/176, 177; 713/170, 171; 705/51, 59
See application file for complete search history.

(56) References Cited

U.S. PATENT DOCUMENTS

| | | | | |
|---|---|---|---|---|
| 6,611,812 B2* | 8/2003 | Hurtado et al. | | 705/51 |
| 7,260,721 B2* | 8/2007 | Tanaka et al. | | 713/170 |
| 7,392,547 B2* | 6/2008 | Cahill et al. | | 726/27 |
| 7,464,273 B2* | 12/2008 | Kugai | | 713/189 |
| 7,493,289 B2* | 2/2009 | Verosub et al. | | 705/51 |
| 7,503,074 B2* | 3/2009 | Dublish et al. | | 726/27 |

(Continued)

FOREIGN PATENT DOCUMENTS
EP    1513113 A1    3/2005
(Continued)

*Primary Examiner* — Haresh N Patel
*Assistant Examiner* — Linglan Edwards
(74) *Attorney, Agent, or Firm* — Birch, Stewart, Kolasch & Birch, LLP

(57) ABSTRACT

A terminal writes first encrypted data in which a communication key and an owner ID are encrypted by using a public key into a second recording medium, and this medium is mounted to a communication apparatus so that the first encrypted data are transmitted to a server. The server sends second encrypted data which it acquires by encrypting a content decryption key by using the communication key which the server acquires by decrypting the received first encrypted data by using a secret key to the communication apparatus, and causes the communication apparatus to record them into the second recording medium. The terminal decrypts a content stored in a first recording medium by using the content decryption key which it acquires by decrypting the second encrypted data read from the second recording medium by using the communication key.

11 Claims, 11 Drawing Sheets

U.S. PATENT DOCUMENTS

| | | | |
|---|---|---|---|
| 7,512,798 B2 * | 3/2009 | Cahill et al. | 713/170 |
| 7,546,641 B2 * | 6/2009 | Robert et al. | 726/30 |
| 7,599,890 B2 * | 10/2009 | Hori et al. | 705/51 |
| 7,715,558 B2 * | 5/2010 | Yamamoto et al. | 380/201 |
| 2002/0114461 A1 * | 8/2002 | Shimada et al. | 380/201 |
| 2003/0126440 A1 * | 7/2003 | Go et al. | 713/168 |
| 2004/0098348 A1 * | 5/2004 | Kawasaki et al. | 705/59 |
| 2004/0120527 A1 | 6/2004 | Hawkes et al. | |
| 2005/0086479 A1 * | 4/2005 | Ondet et al. | 713/172 |

FOREIGN PATENT DOCUMENTS

| | | |
|---|---|---|
| JP | 2002-83152 A | 3/2002 |
| JP | 2002-319932 A | 10/2002 |
| JP | 2005-198336 A | 7/2005 |

* cited by examiner

FIG. 3
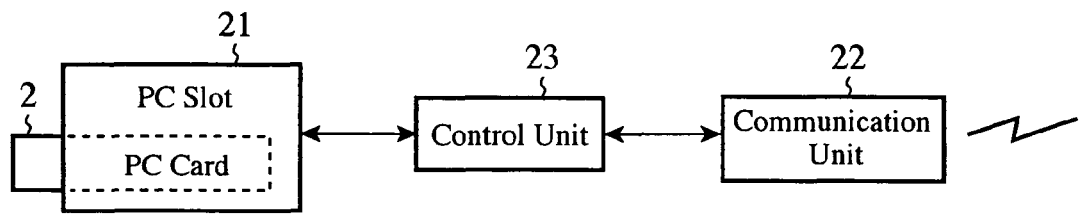
FIG. 4
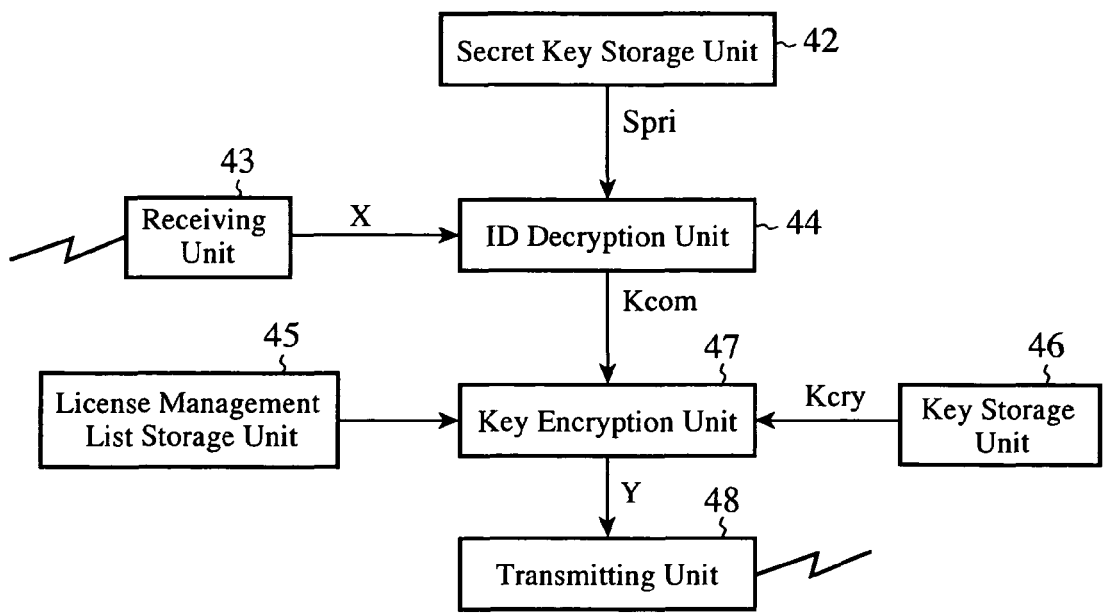
FIG. 5
| Serial Number | Usable or Unusable |
|---|---|
| 0000-0000-000 | 0 |
| 0000-0000-001 | 0 |
| 0000-0000-002 | 0 |
| 0000-0000-003 | 1 |
| ⋮ | ⋮ |

| Serial Number | Usable or Unusable | Key Information |
|---|---|---|
| 0000-0000-000 | 0 | da90-92d1-0s32-0bcc |
| 0000-0000-001 | 0 | 79da-002f-9b73-2ee9 |
| 0000-0000-002 | 0 | 0543-aabc-de40-0054 |
| 0000-0000-003 | 1 | e878-f318-acde-7763 |
| ⋮ | ⋮ | ⋮ |

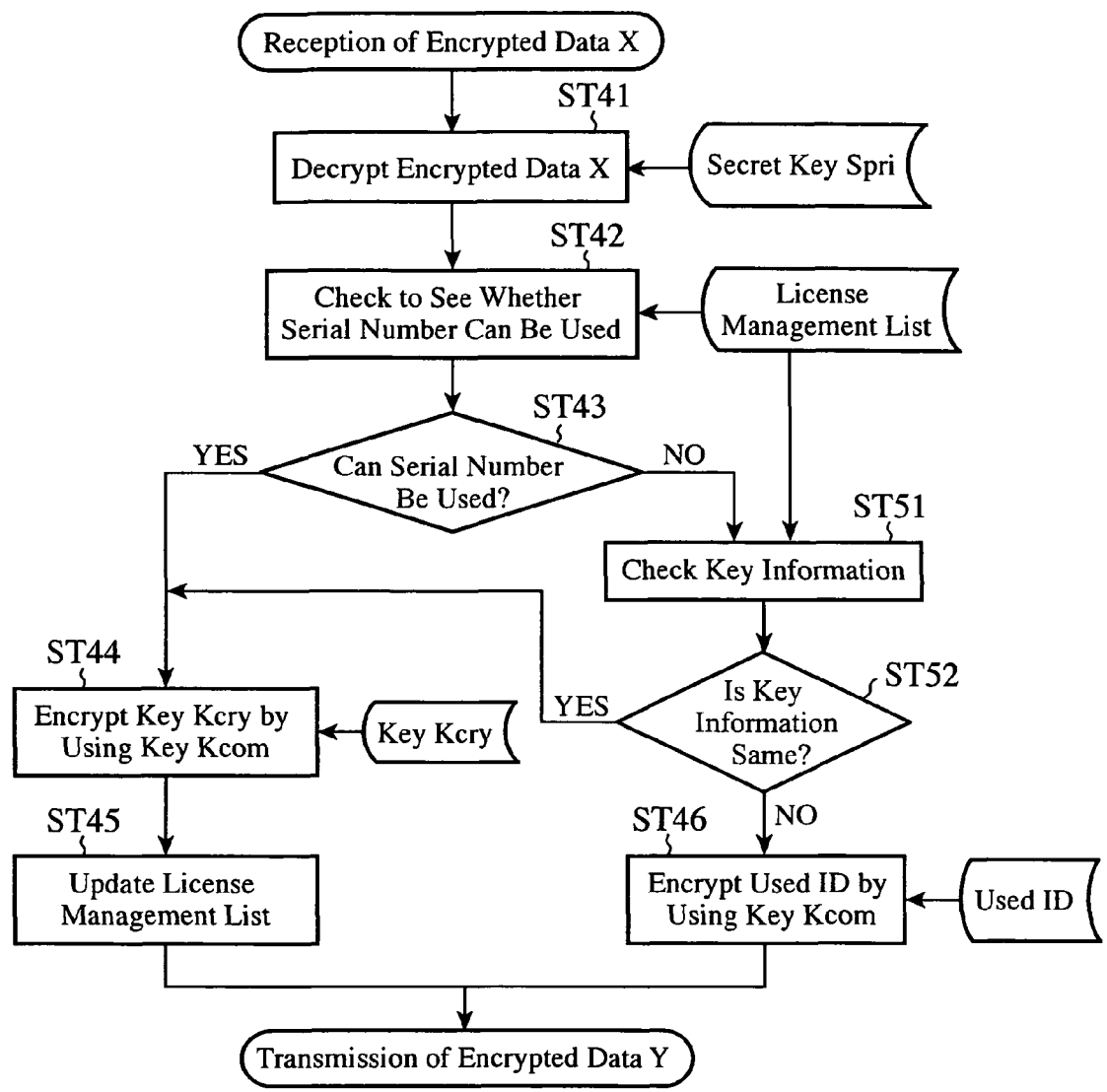

| Vehicle ID Number | Usable or Unusable | Key Information |
|---|---|---|
| AAAA-0000-000 | 0 | da90-92d1-0s32-0bcc |
| BBBB-0000-001 | 0 | 79da-002f-9b73-2ee9 |
| CCCC-0000-002 | 0 | 0543-aabc-de40-0054 |
| DDDD-0000-003 | 1 | e878-f318-acde-7763 |
| ⋮ | ⋮ | ⋮ |

Vehicle ID Number List

| Vehicle ID Number Index | Vehicle ID Number | Usable or Unusable |
|---|---|---|
| 0 | AAAA-0000-0000 | 0 |
| 1 | BBBB-0000-0001 | 0 |
| 2 | CCCC-0000-0002 | 0 |
| 3 | DDDD-0000-0003 | 1 |
| ⋮ | ⋮ | ⋮ |

(b)

Serial Number List

| Serial Number Index | Serial Number | Usable or Unusable |
|---|---|---|
| 0 | 0000-0000-000 | 0 |
| 1 | 0000-0000-001 | 0 |
| 2 | 0000-0000-002 | 0 |
| 3 | 0000-0000-003 | 1 |
| ⋮ | ⋮ | ⋮ |

(c)

Correspondence Management List

| Vehicle ID Number Index | Serial Number Index |
|---|---|
| 0 | 3 |
| 1 | 2 |
| 2 | 0 |
| 3 | 1 |
| ⋮ | ⋮ |

FIG. 16

(a) Vehicle ID Number List

| Vehicle ID Number Index | Vehicle ID Number | Usable or Unusable |
|---|---|---|
| 0 | AAAA-0000-0000 | 0 |
| 1 | BBBB-0000-0001 | 0 |
| 2 | CCCC-0000-0002 | 0 |
| 3 | DDDD-0000-0003 | 1 |
| ⋮ | ⋮ | ⋮ |

(b) Serial Number List

| Serial Number Index | Serial Number | Usable or Unusable |
|---|---|---|
| 0 | 0000-0000-000 | 0 |
| 1 | 0000-0000-001 | 0 |
| 2 | 0000-0000-002 | 0 |
| 3 | 0000-0000-003 | 1 |
| ⋮ | ⋮ | ⋮ |

(c) Correspondence Management List

| Vehicle ID Number Index | Serial Number Index | Key Information |
|---|---|---|
| 0 | 3 | da90-92d1-0s32-0bcc |
| 1 | 2 | 79da-002f-9b73-2ee9 |
| 2 | 0 | 0543-aabc-de40-0054 |
| 3 | 1 | e878-f318-acde-7763 |
| ⋮ | ⋮ | ⋮ |

CONTENT DISTRIBUTION SYSTEM, TERMINAL, AND SERVER

FIELD OF THE INVENTION

The present invention relates to a content distribution system which distributes a content from a server to a user's terminal, the terminal, and the server. More particularly, it relates to a technology for distributing a content to a terminal which cannot use a communication function.

BACKGROUND OF THE INVENTION

In recent years, as the Internet becomes widespread and memory media have an improved performance and decrease in cost, a content distribution system which writes a large volume of content, such as music data and program data, into a memory medium, and distributes it to a user, and which enables the user to acquire a key which is given as access to use the content stored in the memory medium from a server for exclusive use via communications by connecting with the server via the Internet is used.

As such a content distribution system, for example, patent reference 1 discloses a content distribution system which supports mobile terminal players. The content distribution system disclosed by this patent reference 1 is comprised of a content provider equipped with a content server and a user information data base including user's downloaded information and right information data, for distributing a content according to a check-in check-out rule of SDMI via a communication network, and a user's mobile terminal player having a recording medium playback function of playing back a content downloaded to a recording medium, and a check-in function of returning the right to be able to play back a content to the content provider. In the case of distributing a content to the mobile terminal player, the content provider manages the number of times of check-out of the content to the user, when the user checks in the content distributed, the mobile terminal player performs content distribution management in such a way as to erase an encryption key for playback of the content and the registration of the file name.
[Patent reference 1] JP,2002-83152,A Because the content distribution system disclosed by above-mentioned patent reference 1 is constructed in such a way as to carry out, via communications, acquisition and return of a key which is given as access to use a content from and to a content provider which performs management of content distribution, the content distribution system is based on the premise that equipment using the content has a communication function. Therefore, equipment which cannot use the communication function cannot use such a content distribution system.

Hereafter, application of a content distribution system as mentioned above to a car navigation apparatus is considered. Although most of recently-developed car navigation apparatuses have a communication function, many car navigation apparatuses use a mobile phone as a communications means. However, because there is a large difference in periods of use (use cycles) between mobile phones and car navigation apparatuses, there is a case in which, when a user buys a new mobile phone, the user cannot use his or her new mobile phone as the communications means of his or her car navigation apparatus. Furthermore, there are cases in which a cable for exclusive use is required for connection between a mobile phone and a car navigation apparatus, and therefore some users do not use the communication functions of their car navigation apparatuses. Therefore, under present circumstances, a problem is that it is difficult to apply a content distribution system as mentioned above to a car navigation apparatus, just as it is.

The present invention is made to solve the above-mentioned problem, and it is therefore an object of the present invention is to provide a content distribution system which safely distributes a key to a terminal having no communication function so as to enable the terminal to use a content, the terminal, and a server.

DISCLOSURE OF THE INVENTION

In order to solve the aforementioned problem, in accordance with the present invention, there is provided a content distribution system provided with a first recording medium in which a content encrypted by using a content encryption key is stored, a second recording medium which can be carried, a terminal to and from which the first recording medium and the second recording medium can be attached and detached, a communication apparatus to and from which the second recording medium can be attached and detached, and a server connected to the communication apparatus via a network, in which the terminal includes: a key generation unit for generating a communication key; a public key storage unit for storing a public key which pairs up with a secret key stored in the server; an ID encryption unit for encrypting both an owner ID which the terminal has and the communication key generated by the key generation unit by using the public key stored in the public key storage unit so as to generate first encrypted data; a write unit for, when the second recording medium is mounted to the terminal, writing the first encrypted data generated by the ID encryption unit in the second recording medium; a read unit for, when the second recording medium in which second encrypted data are written by the communication apparatus is mounted to the terminal, reading the second encrypted data from the second recording medium; a key decryption unit for decrypting the second encrypted data read by the read unit by using the communication key generated by the key generation unit; and a content decrypting unit for, when the first recording medium is mounted to the terminal, decrypting the content stored in the first recording medium by using a content decryption key which the key decryption unit acquires by decrypting the second encrypted data, and in which the communication apparatus includes: a control unit for reading the first encrypted data from the second recording medium in response to mounting of the second recording medium in which the first encrypted data are written by the terminal, and then transmitting the first encrypted data to the server so as to make a request for acquisition of a license, and for receiving the second encrypted data transmitted from the server in response to the license acquisition request and then writing the second encrypted data in the second recording medium, and the server includes: a secret key storage unit for storing the secret key which pairs up with the public key stored in the terminal; a key storage unit for storing the content decryption key; a receiving unit for receiving the first encrypted data which are transmitted, as the license acquisition request, from the communication apparatus via the network; an ID decryption unit for decrypting the first encrypted data received by the receiving unit by using the secret key stored in the secret key storage unit; a key encryption unit for encrypting the content decryption key stored in the key storage unit by using the communication key which the ID decryption unit acquires by decrypting the first encrypted data so as to generate the second encrypted data; and a transmitting unit for transmitting the second encrypted data generated by the key encryption unit to the communication apparatus as a response to the license acquisition request.

Because the content distribution system in accordance with the present invention makes it possible for even the terminal which cannot establish any connection with the network to communicate, via the communication apparatus, with the server which manages the license by using the second recording medium, and to acquire the content decryption key used for decoding the encrypted data which are stored in the first recording medium, the server can distribute the content decryption key safely. Therefore, even the terminal which does not have a communication function is enabled to use the content.

BRIEF DESCRIPTION OF THE FIGURES

FIG. 3 is a block diagram showing the detailed structure of a personal computer which constructs the content distribution system in accordance with Embodiment 1 of the present invention;

FIG. 4 is a block diagram showing the detailed structure of a server which constructs the content distribution system in accordance with Embodiment 1 of the present invention;

FIG. 5 is a figure showing a license management list which is used by the server which constructs the content distribution system in accordance with Embodiment 1 of the present invention;

FIG. 9 is a flow chart showing the details of a license verification process which is carried out by the server which constructs the content distribution system in accordance with Embodiment 2 of the present invention;

FIG. 10 is a figure showing a license management list which is used by a server which constructs a content distribution system in accordance with Embodiment 3 of the present invention;

FIG. 14 is a figure showing a license management list which is used by a server which constructs a content distribution system in accordance with Embodiment 5 of the present invention;

FIG. 16 is a figure showing a license management list which is used by a server which constructs a content distribution system in accordance with Embodiment 6 of the present invention.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
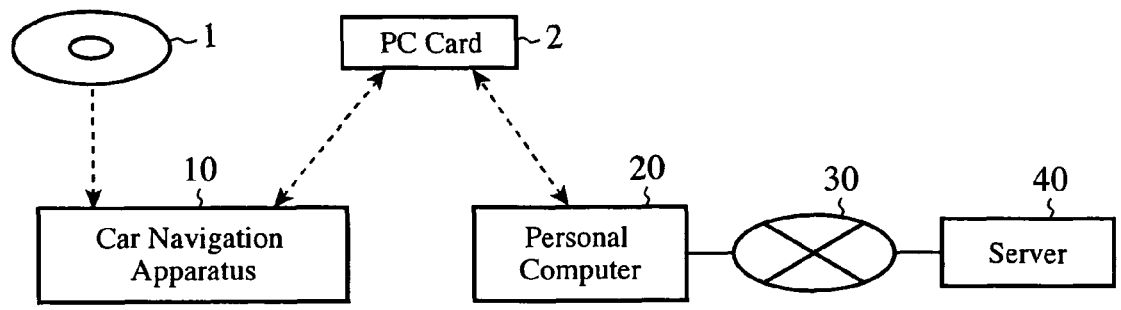
FIG. 1 is a block diagram showing the structure of a content distribution system according to embodiment 1 of the present invention.

FIG. 1 is a block diagram showing the structure of a content distribution system in accordance with Embodiment 1 of the present invention. This content distribution system is comprised of a DVD (Digital Versatile Disk) 1, a PC card (PC Card) 2, a car navigation apparatus 10, a personal computer 20, a network 30, and a server 40. As the network 30, for example, the Internet is used.

The DVD 1 corresponds to a first recording medium according to the present invention, and stores encrypted map update data (a content) which are map update data used for updating a map for navigation which are encrypted by using a key Kcry for data protection. In this case, the key Kcry corresponds to a content encryption key and a content decryption key according to the present invention, and, when the content is encrypted using the key, is called the content encryption key, whereas when the content is decrypted using the key, the key is called the content decryption key. An inherent serial number for managing the license is provided to the DVD 1, and this serial number is used as an owner ID. This DVD 1 is mounted to the car navigation apparatus 10.

The PC card 2 corresponds to a second recording medium according to the present invention, and can be attached to or detached from any of the car navigation apparatus 10 and the personal computer 20. When the PC card 2 is mounted to either of the car navigation apparatus 10 and the personal computer 20, the either one of them can write data in this mounted PC card 2 and can read data from the PC card 2.

Figure 2:
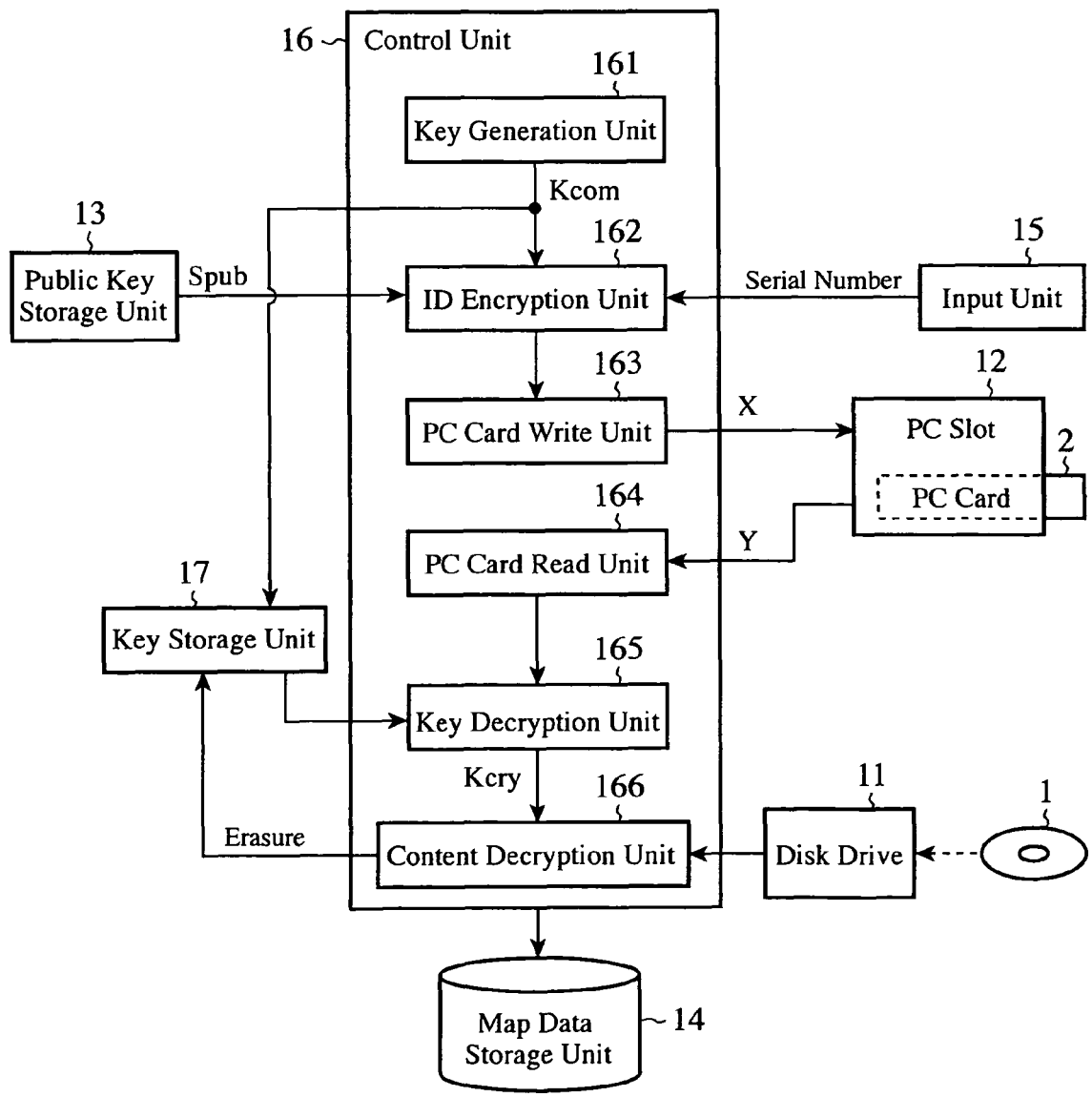
FIG. 2 is a block diagram showing the detailed structure of a car navigation apparatus which constructs the content distribution system in accordance with Embodiment 1 of the present invention.

The car navigation apparatus 10 corresponds to a terminal according to the present invention, and updates the map data which the car navigation apparatus itself holds using the map update data which the car navigation apparatus has acquired by decrypting the encrypted map update data distributed thereto via the DVD 1. FIG. 2 is a block diagram showing the detailed structure of the car navigation apparatus 10. This car navigation apparatus 10 is provided with a disk drive 11, a PC slot 12, a public key storage unit 13, a map data storage unit 14, an input unit 15, a control unit 16, and a key storage unit 17.

When the DVD 1 is mounted thereto, the disk drive 11 reads contents stored in this DVD 1 and sends them to the control unit 16. The PC card 2 is attached to and detached from the PC slot 12. As will be mentioned later in detail, while first encrypted data X are written into the PC card 2 mounted to this PC slot 12 by the control unit 16, second encrypted data Y stored in the PC card 2 are read by the control unit 16.

The public key storage unit 13 is constructed of, for example, a part of an HDD (Hard Disk Drive). A public key Spub which pairs up with a secret key Spri held by the server 40 is stored in this public key storage unit 13 at the time when the car navigation apparatus 10 is manufactured. Therefore, when the car navigation apparatus 10 reaches the user as a product, the public key Spub is already stored in the public key storage unit 13. The public key Spub stored in this public key storage unit 13 is read by the control unit 16.

The map data storage unit 14 is constructed of, for example, another part of the HDD, and stores map data used for displaying a map for navigation. The map data stored in this map data storage unit 14 are updated by using the map update data sent from the control unit 16. The input unit 15 is constructed of, for example, a remote controller, a touch panel, manual operation buttons, or a voice input unit, and the user uses the input unit in order to input the serial number. The serial number inputted from this input unit 15 is sent to the control unit 16.

The control unit 16 is comprised of, for example, a microcomputer. This control unit 16 is comprised of, for example, a key generation unit 161, an ID encryption unit 162, a PC cardwrite unit 163, a PC card read unit 164, a key decryption unit 165, and a content decryption unit 166, which are implemented through software processing by the microcomputer. The PC card write unit 163 corresponds to a write unit according to the present invention, and the PC card read unit 164 corresponds to a read unit according to the present invention.

The key generation unit 161 generates a key Kcom for specifying the car navigation apparatus itself. This key Kcom corresponds to a communication key according to the present invention, and is used as a key with which the server 40 encrypts the key Kcry when the car navigation apparatus 10 acquires the key Kcry for decrypting the encrypted map update data stored in the DVD 1 from the server 40. The key Kcom generated by this key generation unit 161 is sent to both the ID encryption unit 162 and the key storage unit 17.

The ID encryption unit 162 generates the first encrypted data X by encrypting both the serial number of the DVD 1 which is inputted, as the owner ID, from the input unit 15, and the key Kcom sent from the key generation unit 161 by using the public key Spub stored in the public key storage unit 13, and sends the first encrypted data X to the PC card write unit 163. The PC card write unit 163 writes the first encrypted data X sent from the ID encryption unit 162 in the PC card 2 mounted to the PC slot 12.

The PC card read unit 164 reads the second encrypted data Y (which are generated by the server 40 and are written into the PC card by the communication apparatus 20) stored in the PC card 2 mounted to the PC slot 12, and sends the second encrypted data Y to the key decryption unit 165. The key decryption unit 165 decrypts the second encrypted data Y sent from the PC card read unit 164 by using the key Kcom stored in the key storage unit 17 so as to acquire the key Kcry. The key Kcry acquired by this key decryption unit 165 is sent to the content decryption unit 166.

The content decryption unit 166 reads the encrypted map update data from the DVD 1 mounted to the disk drive 11, and decrypts the encrypted map update data using the key Kcry sent from the key decryption unit 165. The content decryption unit 166 also erases the key Kcom stored in the key storage unit 17 after decrypting the encrypted map update data. The map update data acquired through the decrypting by this content decryption unit 166 are sent to the map data storage unit 14, and are used in order to update the map data already stored in this map data storage unit 14.

The key storage unit 17 is constructed of, for example, a part of the HDD, and stores the key Kcom generated by the key generation unit 161. The key Kcom stored in this key storage unit 17 is referred to by the key decryption unit 165. The contents stored in the key storage unit 17 are erased in response to an instruction from the content decryption unit 166.

The personal computer 20 corresponds to a communication apparatus according to the present invention, and mediates transmission and reception of data between the car navigation apparatus 10 and the server 40 by using the PC card 2. FIG. 3 is a block diagram showing the detailed structure of the personal computer 20. This personal computer 20 is provided with a PC slot 21, a communication unit 22, and a control unit 23. The PC slot 21, the communication unit 22, and the control unit 23 correspond to a control unit according to the present invention. In FIG. 3, components which are not related to the present invention are not shown.

The PC card 2 is attached and detached to and from the PC slot 21. The first encrypted data X stored in the PC card 2 mounted to this PC slot 21 are read by the control unit 23. The second encrypted data Y are written into the PC card 2 mounted to the PC slot 21 by the control unit 23. The communication unit 22 controls communications which are carried out between the personal computer and the server 40 via the network 30.

The control unit 23 controls the whole of the personal computer 20. For example, the control unit 23 reads the first encrypted data X from the PC card 2 mounted to the PC slot 21 and sends the first encrypted data X to the communication unit 22, and also writes the second encrypted data Y sent from the communication unit 22 in the PC card 2 mounted to the PC slot 21.

The server 40 is constructed of, for example, a server computer, and manages the license of the map data held by the car navigation apparatus 10. FIG. 4 is a block diagram showing the detailed structure of the server 40. The server 40 is provided with a secret key storage unit 42, a receiving unit 43, an ID decryption unit 44, a license management list storage unit 45, a key storage unit 46, a key encryption unit 47, and a transmitting unit 48.

The secret key storage unit 42 stores the secret key Spri received from the maker, as will be mentioned below. The secret key Spri stored in this secret key storage unit 42 is sent to the ID decryption unit 44. The receiving unit 43 receives the first encrypted data X transmitted, as a license acquisition request, from the personal computer 20 via the network 30, and sends the first encrypted data X to the ID decryption unit 44. The ID decryption unit 44 decrypts the first encrypted data X sent from the receiving unit 43 by using the secret key Spri sent from the secret key storage unit 42 so as to acquire the serial number and the key Kcom. The serial number and the key Kcom which are acquired by this ID decryption unit 44 are sent to the key encryption unit 47.

The license management list storage unit 45 corresponds to an ID storage unit according to the present invention, and, as shown in FIG. 5, stores a license management list which is a pair of the serial number provided to the DVD 1 and usable or unusable information indicating whether or not the DVD can be used. The usable or unusable information indicating whether or not the DVD can be used in the license management list shows whether or not a license is provided for the DVD 1 which has the serial number corresponding to the information indicating whether or not the DVD can be used, i.e., shows whether there exists a right to update the existing map data using the map update data stored in the DVD 1. In an initial state, i.e., in a case in which no update of the map data using the DVD 1 has been made yet, the information indicating whether or not the DVD can be used is set to usable ("0"), whereas when an update of the map data using the DVD 1 has been made even once, the information is set to unusable ("1").

The key storage unit 46 stores the key Kcry used for the generation of the encrypted map update data stored in the DVD 1. The key Kcry stored in this key storage unit 46 is read by the key encryption unit 47. When the key encryption unit 47 recognizes that there exists a right to use the DVD 1 by referring to the license management list stored in the license management list storage unit 45, the key encryption unit encrypts the key Kcry stored in the key storage unit 46 by using the key Kcom which the ID decryption unit 44 has acquired by decrypting it so as to generate the second encrypted data Y, and sends this data to the transmitting unit 48. The transmitting unit 48 transmits the second encrypted data Y sent from the key encryption unit 47 to the personal computer 20 via the network 30.

Next, the operation of the content distribution system in accordance with Embodiment 1 of the present invention which is constructed as mentioned above will be explained.

First, a maker which provides the update map data, for example, the automaker of the vehicle, the maker of the car navigation apparatus 10, or the like generates the key Kcry used for encrypting the map update data, and encrypts the map update data by using this generated key Kcry so as to generate encrypted map update data and writes this data in the DVD 1. A serial number is then provided to the DVD 1 in which the encrypted map update data are written, and the DVD is distributed to a user.

The maker sends the generated key Kcry and the serial number to the server 40. In this specification, "sending" means, for example, sending using a method which is resistant to leakage of information, such as a method of sending information by truck or the like. The server 40 stores the key Kcry received from the maker in the key storage unit 46, generates a license management list which includes a pair of the serial number and the usable or unusable information, and stores the license management list in the license management list storage unit 45. In this case, all pieces of usable or unusable information included are set to usable ("0").

The maker generates a pair of a public key Spub and a secret key Spri, sends the secret key Spri to the server 40, and sends the public key Spub to the car navigation apparatus 10. The server 40 stores the received secret key Spri in the secret key storage unit 42. The car navigation apparatus 10 stores the received public key Spub in the public key storage unit 13. The storing of the public key Spub in the public key storage unit 13 is performed at the time when the car navigation apparatus 10 is manufactured.

In the above-mentioned state, when the user updates the map data stored in the map data storage unit 14 of the car navigation apparatus 10, he or she mounts the DVD 1 which the user has purchased in the disk drive 11 of the car navigation apparatus 10. As a result, a map data update process is started. In this case, although the key Kcry for decrypting the encrypted map update data stored in the DVD 1 is required, if the car navigation apparatus 10 cannot connect with the server 40 via the network 30 (for example, in a case in which the user's mobile phone has a function of connecting with the network 30, but does not support communications with the car navigation apparatus 10), a process of acquiring the key Kcry from the server 40 is carried out according to the following procedure.

Hereafter, the process of updating the map data will be explained with reference to a sequence chart shown in FIG. 6. In the car navigation apparatus 10, when the DVD 1 is mounted to the disk drive 11, the key Kcom is generated (step ST11). More specifically, the key generation unit 161 of the control unit 16 generates the key Kcom used for encryption at the time of acquiring the key Kcry from the server 40, and sends the key to the ID encryption unit 162 and also sends the key to the key storage unit 17. The key Kcom stored in the key storage unit 17 is used for decrypting second encrypted data later.

When the serial number recorded in the DVD 1 is then inputted from the input unit 15, first encrypted data X are generated (step ST12). More specifically, the ID encryption unit 162 encrypts both the serial number of the DVD 1 mounted to the disk drive 11 and the key Kcom sent from the key generation unit 161 by using the public key Spub stored in the public key storage unit 13 so as to generate the first encrypted data X, and sends this data to the PC card write unit 163. The mounting of the DVD 1, the generation of the key Kcom, and the input of the serial number can be carried out in an arbitrary order.

The first encrypted data X are then written in the PC card 2 (step ST13). More specifically, the PC card write unit 163 writes the first encrypted data X sent from the ID encryption unit 162 in the PC card 2 mounted to the PC slot 12. After that, the user draws out the PC card 2 from the car navigation apparatus 10, and mounts it in the PC slot 21 of the personal computer 20.

Transmission of the first encrypted data X is performed by the personal computer 20 (step ST21). More specifically, the control unit 23 of the personal computer 20 reads the first encrypted data X stored in the PC card 2 mounted to the PC slot 21, and sends the first encrypted data to the communication unit 22. The communication unit 22 connects with the server 40 via the network 30, and sends, as a license acquisition request, the first encrypted data X sent from the control unit 23 to the server 40.

In the server 40, the first encrypted data X sent as a license acquisition request are received (step ST31). More specifically, the receiving unit 43 of the server 40 receives the first encrypted data X transmitted, via the network 30, from the personal computer 20, and sends the first encrypted data X to the ID decryption unit 44.

A license verification process is then carried out (step ST32). Hereafter, the details of the license verification process will be explained with reference to a flow chart shown in FIG. 7. In this license verification process, when the first encrypted data X as a license acquisition request are received, decryption of the first encrypted data X is carried out first (step ST41). More specifically, the ID decryption unit 44 decrypts the first encrypted data X sent from the receiving unit 43 by using the secret key Spri stored in the secret key storage unit 42 so as to acquire the serial number and the key Kcom. The serial number and the key Kcom which are thus acquired by this ID decryption unit 44 are sent to the key encryption unit 47.

Whether or not the serial number can be used is then checked to see (step ST42). More specifically, the key encryption unit 47 reads the license management list from the license management list storage unit 45, and acquires the usable or unusable information corresponding to the serial number acquired through the decrypting in step ST41. The key encryption unit then checks to see whether or not the DVD 1 having the serial number which has been acquired through the decrypting in step ST41 can be used (step ST43). More specifically, the key encryption unit 47 checks to see whether the usable or unusable information which the key encryption unit has acquired in step ST42 is "0" or "1".

When, in this step ST43, judging that the DVD can be used, i.e., that the usable or unusable information is "O", the key encryption unit encrypts the key Kcry by using the key Kcom (step ST44). More specifically, the key encryption unit 47 reads the key Kcry from the key storage unit 46, encrypts this read key Kcry by using the key Kcom sent from the ID decryption unit 44 so as to generate second encrypted data Y, and then sends this data to the transmitting unit 48.

An update of the license management list is then carried out (step ST45). More specifically, the key encryption unit 47 sets the usable or unusable information of the license management list which the key encryption unit has acquired in step ST42 to "1", and stores the usable or unusable information in the license management list storage unit 45. Then, the license verification process by the server 40 is ended.

When, in above-mentioned step ST43, judging that the DVD cannot be used, i.e., that the usable or unusable information is "1", the key encryption unit encrypts a used ID by using the key Kcom (step ST46). More specifically, the key encryption unit 47 generates a used ID showing that the serial number is already used and there exists no right to use the DVD, generates second encrypted data Y by encrypting this generated used ID by using the key Kcom sent from the ID decryption unit 44, and then sends the second encrypted data Y to the transmitting unit 48. Then, the license verification process by the server 40 is ended.

Figure 6:
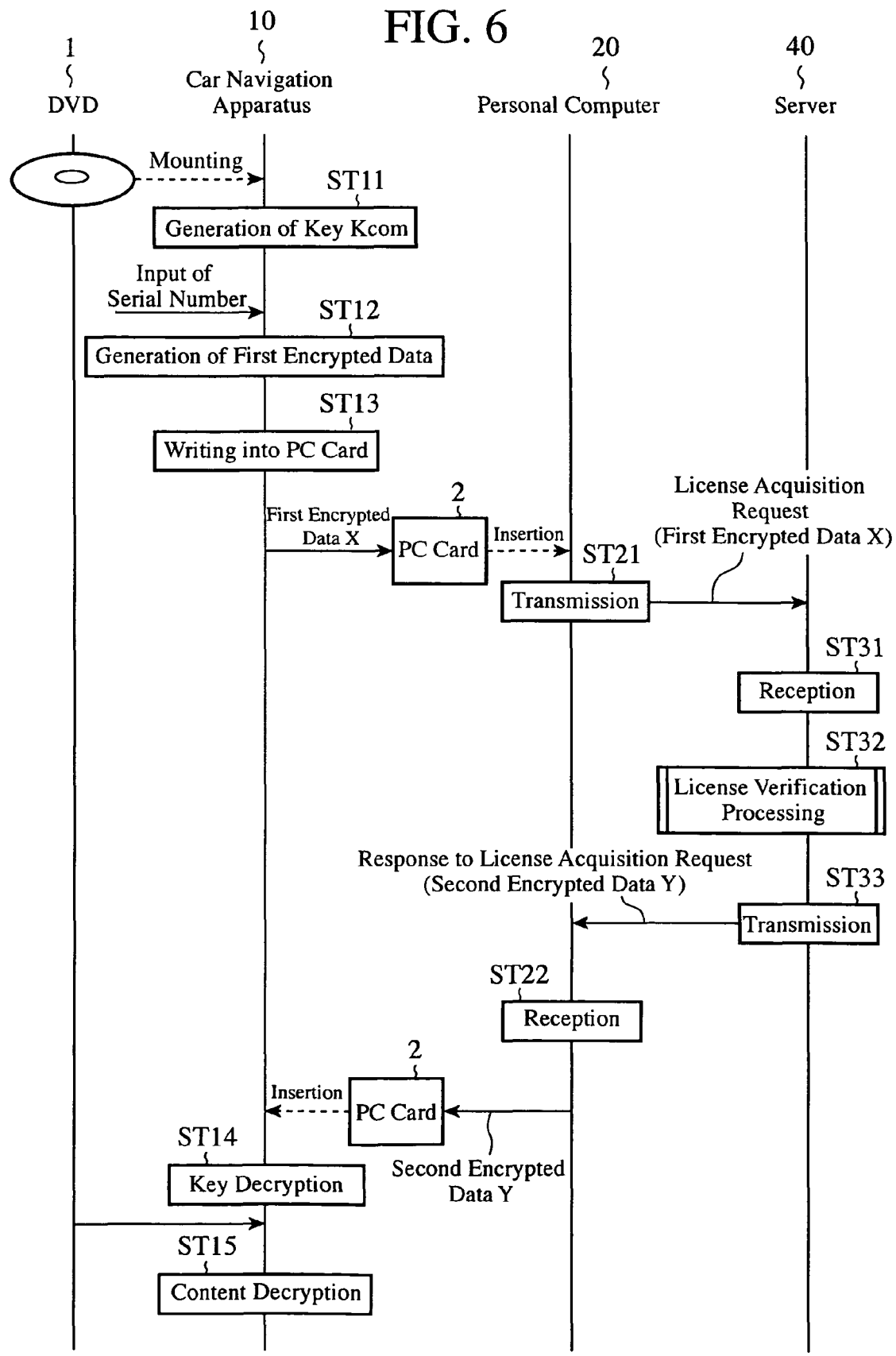
FIG. 6 is a sequence chart showing the operation of the content distribution system in accordance with Embodiment 1 of the present invention.

After the license verification process is ended, transmission is carried out as shown in FIG. 6 (step ST33). More specifically, the transmitting unit 48 of the server 40 transmits, as a response of the license acquisition request, the second encrypted data Y sent from the key encryption unit 47 to the personal computer 20 via the network 30.

Reception of the second encrypted data Y is performed by the personal computer 20 (step ST22). More specifically, the communication unit 22 of the personal computer 20 receives the second encrypted data Y transmitted, via the network 30, from the server 40, and sends the second encrypted data Y to the control unit 23. The control unit 23 writes the second encrypted data Y received from the communication unit 22 in the PC card 2 mounted to the PC slot 21. After that, the user draws out the PC card 2 from the PC slot 21 of the personal computer 20, and mounts the PC card in the PC slot 12 of the car navigation apparatus 10.

Key decryption is performed by the car navigation apparatus 10 (step ST14). More specifically, the PC card read unit 164 of the car navigation apparatus 10 reads the second encrypted data Y stored in the PC card 2 mounted to the PC slot 12, and sends the second encrypted data Y to the key decryption unit 165. The key decryption unit 165 acquires either the key Kcry or the used ID by decrypting the second encrypted data Y sent from the PC card read unit 4 by using the key Kcom stored in the key storage unit 17, and sends either the key Kcry or the used ID to the content decryption unit 166.

Content decryption is then carried out (step ST15). More specifically, when receiving the key Kcry sent from the key decryption unit 165, the content decryption unit 166 reads the encrypted map update data from the DVD 1 mounted to the disk drive 11 and decrypts the encrypted map update data by using the key Kcry. After this decryption is completed, the content decryption unit 166 erases the key Kcom stored in the key storage unit 17. The map update data acquired through the decryption by this content decryption unit 166 are sent to the map data storage unit 14, and are used in order to update the existing map data.

In contrast, when the used ID is sent from the key decryption unit 165 to the content decryption unit 166, the content decryption unit 166 assumes that the DVD 1 mounted to the car navigation apparatus 10 is a replicated one (it is not an authorized one) and notifies the user that the DVD is a replicated one. Therefore, while the car navigation apparatus can acquire the key Kcry from the server 40 when the DVD 1 is an authorized one, the car navigation apparatus cannot acquire the key Kcry from the server when the DVD is not an authorized one. Therefore, any unauthorized use of the DVD 1 can be prevented.

As explained above, even if the car navigation apparatus 10 cannot establish any connection with the network 30, the content distribution system in accordance with this Embodiment 1 can communicate with the server 40 which manages the license so as to acquire the key Kcry used for decrypting the encrypted map update data stored in the DVD 1 by using the PC card 2 and therefore the server 40 can distribute the key Kcry to the car navigation apparatus safely.

Embodiment 2

A content distribution system in accordance with Embodiment 2 of the present invention is modified from the content distribution system in accordance with Embodiment 1 in such a way that the content distribution system of Embodiment 2 can carry out distribution of the key Kcry a number of times.

The content distribution system in accordance with this Embodiment 2 is the same as the content distribution system in accordance with Embodiment 1 except for the structure of the license management list stored in the license management list storage unit 45 of the server 40, and the operation of the server 40. Hereafter, the structure and the operation different from those of Embodiment 1 will be explained mainly.

Figures 7, 8:
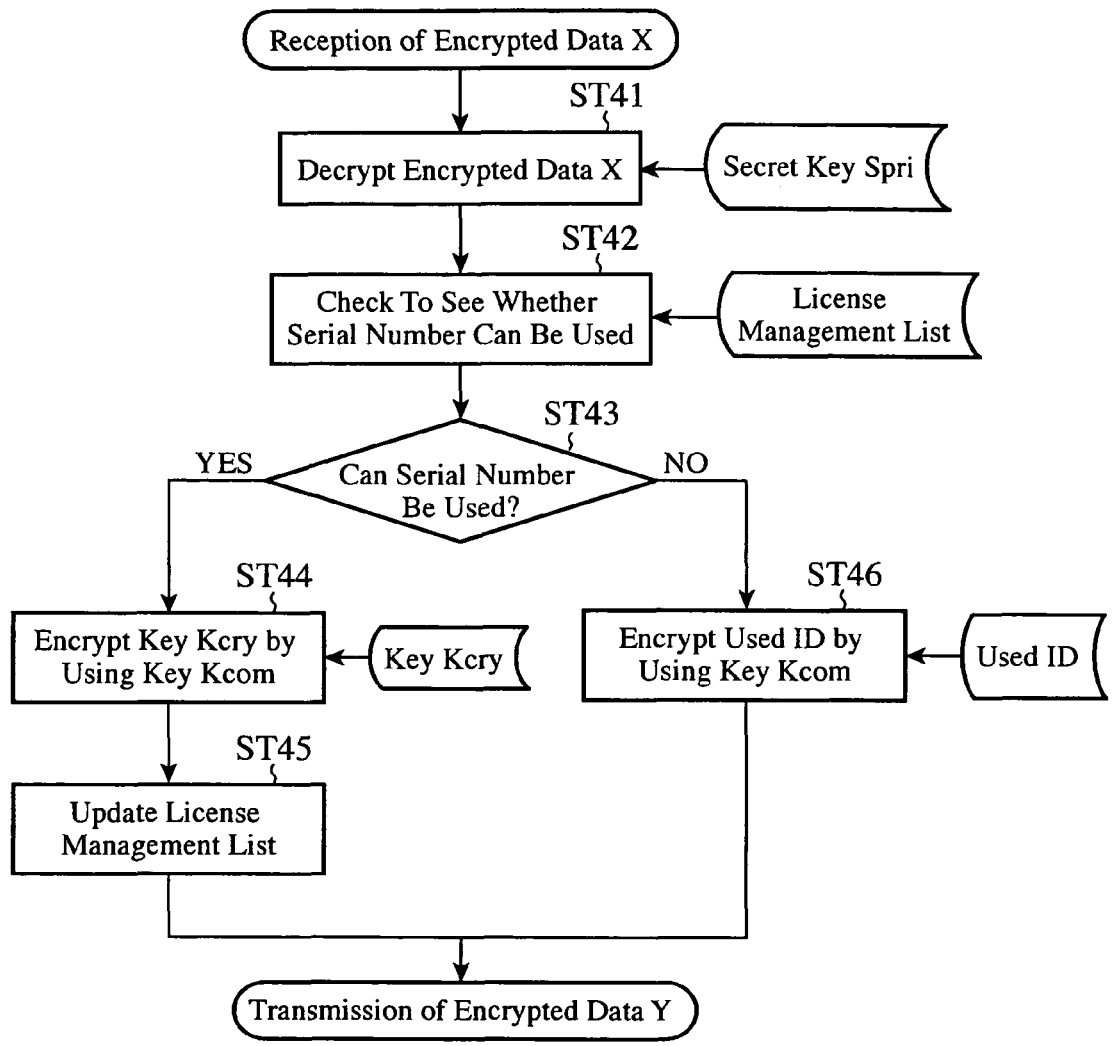
FIG. 7 is a flow chart showing the details of a license verification process which is carried out by the server which constructs the content distribution system in accordance with Embodiment 1 of the present invention.
FIG. 8 is a figure showing a license management list which is used by a server which constructs a content distribution system in accordance with Embodiment 2 of the present invention.

FIG. 8 is a diagram showing the structure of the license management list stored in the license management list storage unit 45. This license management list is constructed in such a way that an item called "key information" is added to the license management list in accordance with Embodiment 1 shown in FIG. 5. As the key information, the key Kcom generated by the car navigation apparatus 10 is used.

Next, the operation of the content distribution system in accordance with Embodiment 2 of the present invention which is constructed as mentioned above will be explained. This content distribution system differs from that according to Embodiment 1 only in the license verification process (i.e., the process shown in step ST32 of FIG. 6) which is performed by the server 40. Therefore, the details of the license verification process will be explained with reference to a flow chart shown in FIG. 9. The steps in which the same processes as those of Embodiment 1 are preformed respectively are designated by the same numerals as those shown in Embodiment 1, and the explanation of the steps will be simplified.

In the license verification process, when the first encrypted data X are received as a license acquisition request, the first encrypted data X are decrypted first (step ST41). Whether or not the serial number can be used is then checked to see (step ST42). Whether or not the DVD 1 having the serial number which has been acquired through the decrypting in step ST41 can be used is then checked to see (step ST43). When it is, in this step ST43, judged that the DVD can be used, i.e., that the usable or unusable information is "0" (yet-to-be-used), the key Kcry is encrypted by using the key Kcom and the second encrypted data Y are generated (step ST44). The second encrypted data Y generated in this step ST44 are sent to the transmitting unit 48. An update of the license management list is then carried out (step ST45). More specifically, the usable or unusable information of the license management list stored in the license management list storage unit 45 is set to "1"

(unusable), the value of the key Kcom is stored as the key information. Then, the license verification process by the server 40 is ended.

When it is, in above-mentioned step ST43, judged that the DVD cannot be used, i.e., that the usable or unusable information is "1" (already used), the key information is checked (step ST51). More specifically, the key encryption unit 47 acquires the key information from the license management list stored in the license management list storage unit 45. Whether or not the key information is the same key is then checked to see (step ST52). More specifically, the key encryption unit 47 checks to see whether or not the key information acquired from the license management list storage unit 45 is the same as the key Kcom received from the car navigation apparatus 10.

When it is, in this step ST52, judged that they are the same as each other, the sequence advances to step ST44 in which the above-mentioned processing is performed. In contrast, when it is, in step ST52, judged that they are not the same as each other, the used ID is encrypted by using the key Kcom and the second encrypted data are generated (step ST46). The second encrypted data Y generated in this step ST46 are then sent to the transmitting unit 48.

As explained above, because the content distribution system in accordance with Embodiment 2 of the present invention is constructed in such a way as to record the key information into the server 40 while associating the key information with the license management list, the content distribution system can permit multiple times of distribution of the key when a license acquisition request is issued with the same key Kcom. As a result, when the data stored in the PC card 2 are erased accidentally or the PC card 2 is damaged in course of the process of distributing the key Kcry from the server 40 to the car navigation apparatus 10, the content distribution system can cause the car navigation apparatus 10 to transmit the first encrypted data X to the server 40 again and enable the car navigation apparatus 10 to receive distribution of the key Kcry from the server 40 again. In this case, when recording the first encrypted data X into the PC card 2 again, the car navigation apparatus 10 does not perform key generation newly, but uses the already-generated key Kcom.

Embodiment 3

In above-mentioned Embodiments 1 and 2, the serial number provided to the DVD 1 is used as the owner ID. In contrast, in a content distribution system in accordance with this Embodiment 3, as the owner ID, a "vehicle ID number" inherently assigned to the vehicle (i.e., the car navigation apparatus 10) is used.

The content distribution system in accordance with this Embodiment 3 differs from the content distribution system in accordance with Embodiment 1 in the structure of the license management list stored in the license management list storage unit 45 of the server 40, the function of the ID encryption unit 162, which is included in the control unit 16 of the car navigation apparatus 10, and the operation of the server 40. Hereafter, the structure and the operation different from those of Embodiment 1 will be explained mainly.

FIG. 10 is a diagram showing the structure of the license management list stored in the license management list storage unit 45. This license management list is constructed in such a way that the serial number of the license management list in accordance with Embodiment 1 shown in FIG. 5 is replaced by the "vehicle ID number".

The ID encryption unit 162 generates the first encrypted data X by encrypting both the vehicle ID number inputted, as the owner ID, from the input unit 15, and the key Kcom sent from the key generation unit 161 by using the public key Spub stored in the public key storage unit 13, and sends the first encrypted data X to the PC card write unit 163.

Next, the operation of the content distribution system in accordance with Embodiment 3 of the present invention which is constructed as mentioned above will be explained. This content distribution system differs from that according to Embodiment 1 only in the process of generating the first encrypted data X which is performed by the car navigation apparatus 10 (step ST12 of FIG. 6), and the license verification process which is performed by the server 40 (the process shown in step ST32 of FIG. 6). Therefore, only the different processes will be explained.

In step ST12 shown in FIG. 6, when the vehicle ID number is inputted from the input unit 15, the first encrypted data X are generated. More specifically, the ID encryption unit 162 generates the first encrypted data X by encrypting both the vehicle ID number inputted from the input unit 15 and the key Kcom sent from the key generation unit 161 by using the public key Spub stored in the public key storage unit 13, and sends the first encrypted data X to the PC card write unit 163. The subsequent processes are the same as those shown in Embodiment 1.

Next, the details of the license verification process which is performed by the server 40 will be explained with reference to a flow chart shown in FIG. 11. The steps in which the same processes as those of Embodiment 1 are preformed respectively are designated by the same numerals as those shown in Embodiment 1, and the explanation of the steps will be simplified.

In the license verification process, when the first encrypted data X are received as a license acquisition request, the first encrypted data X are decrypted first (step ST41). Whether or not the vehicle ID number can be used is then checked to see (step ST61). More specifically, the key encryption unit 47 reads the license management list from the license management list storage unit 45 so as to acquire the usable or unusable information corresponding to the vehicle ID number acquired through the decrypting in step ST41. Whether the car navigation apparatus 10 which has the vehicle ID number acquired through the decrypting in step ST41 can use the DVD 1 is then checked to see (step ST43).

When it is, in this step ST43, judged that the DVD can be used, i.e., that the usable or unusable information is "0" (yet-to-be-used), the key Kcry is encrypted by using the key Kcom and the second encrypted data Y are generated (step ST44). The second encrypted data Y generated in this step ST44 are sent to the transmitting unit 48. An update of the license management list is then carried out (step ST45). Then, the license verification process by the server 40 is ended.

When it is, in above-mentioned step ST43, judged that the DVD cannot be used, i.e., that the usable or unusable information is "1" (already used), the used ID is encrypted using the key Kcom and the second encrypted data are generated (step ST46). The second encrypted data Y generated in this step ST46 are sent to the transmitting unit 48.

As explained above, even if the car navigation apparatus 10 cannot establish any connection with the network 30, the content distribution system in accordance with this Embodiment 3 can communicate with the server 40 which manages the license so as to acquire the key Kcry used for decrypting the encrypted map update data stored in the DVD 1 by using the PC card 2 and therefore the server 40 can distribute the key Kcry to the car navigation apparatus safely. In this case, because the server 40 manages the license by using the vehicle ID number provided to each vehicle, the content distribution system does not need to assign an individual serial number to the DVD1, unlike the content distribution systems in accordance with above-mentioned Embodiments 1 and 2.

Embodiment 4

A content distribution system in accordance with Embodiment 4 of the present invention is modified from the content distribution system in accordance with Embodiment 3 in such a way that the content distribution system of this Embodiment 4 can carry out distribution of the key Kcry a number of times.

The content distribution system in accordance with this Embodiment 4 is the same as the content distribution system in accordance with Embodiment 3 except for the structure of the license management list stored in the license management list storage unit 45 of the server 40, and the operation of the server 40. Hereafter, the structure and the operation different from those of Embodiment 3 will be explained mainly.

Figures 11, 12:
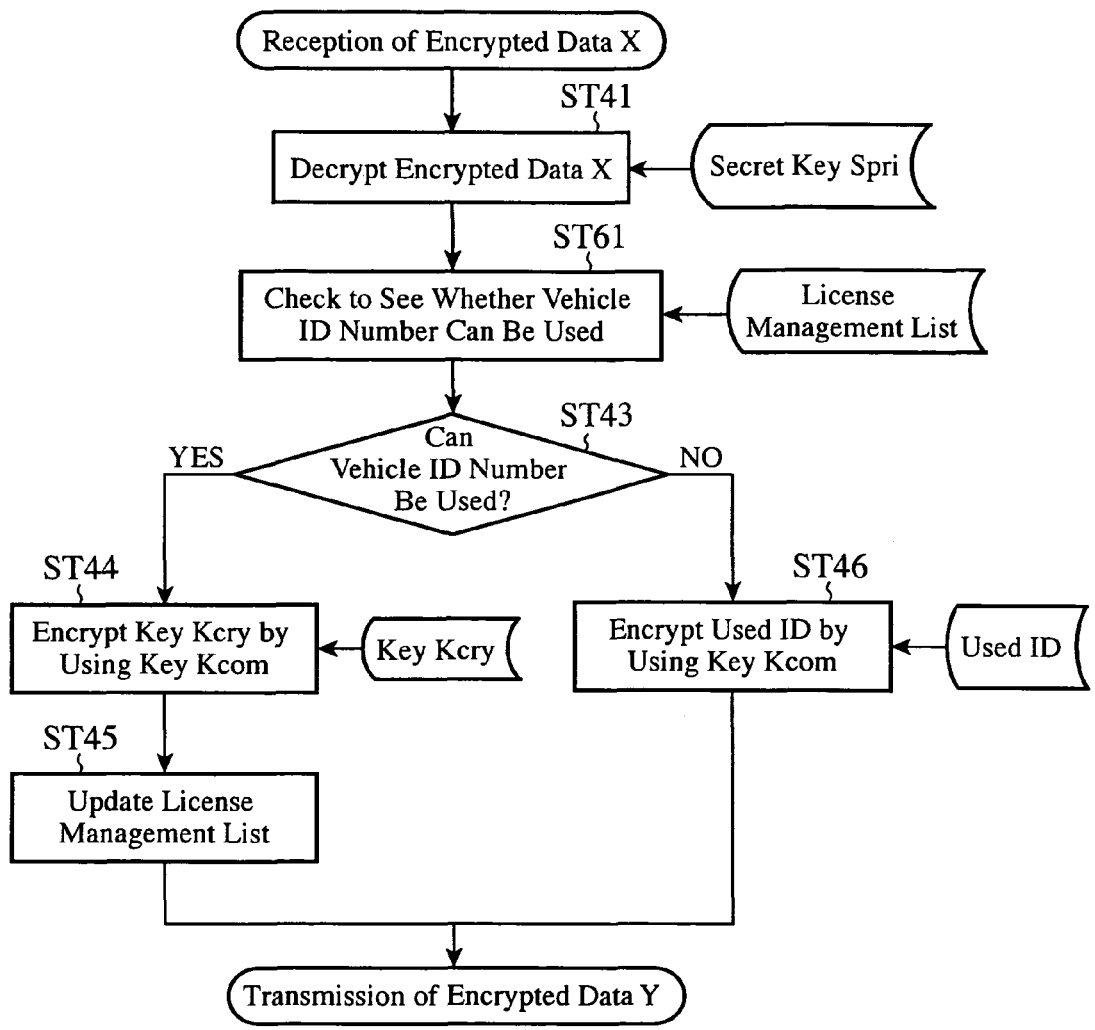
FIG. 11 is a flow chart showing the details of a license verification process which is carried out by the server which constructs the content distribution system in accordance with Embodiment 3 of the present invention.
FIG. 12 is a figure showing a license management list which is used by a server which constructs a content distribution system in accordance with Embodiment 4 of the present invention.

FIG. 12 is a diagram showing the structure of the license management list stored in the license management list storage unit 45. This license management list is constructed in such a way that an item called "key information" is added to the license management list in accordance with Embodiment 3 shown in FIG. 10. As the key information, the key Kcom generated by the car navigation apparatus 10 is used.

Figure 13:
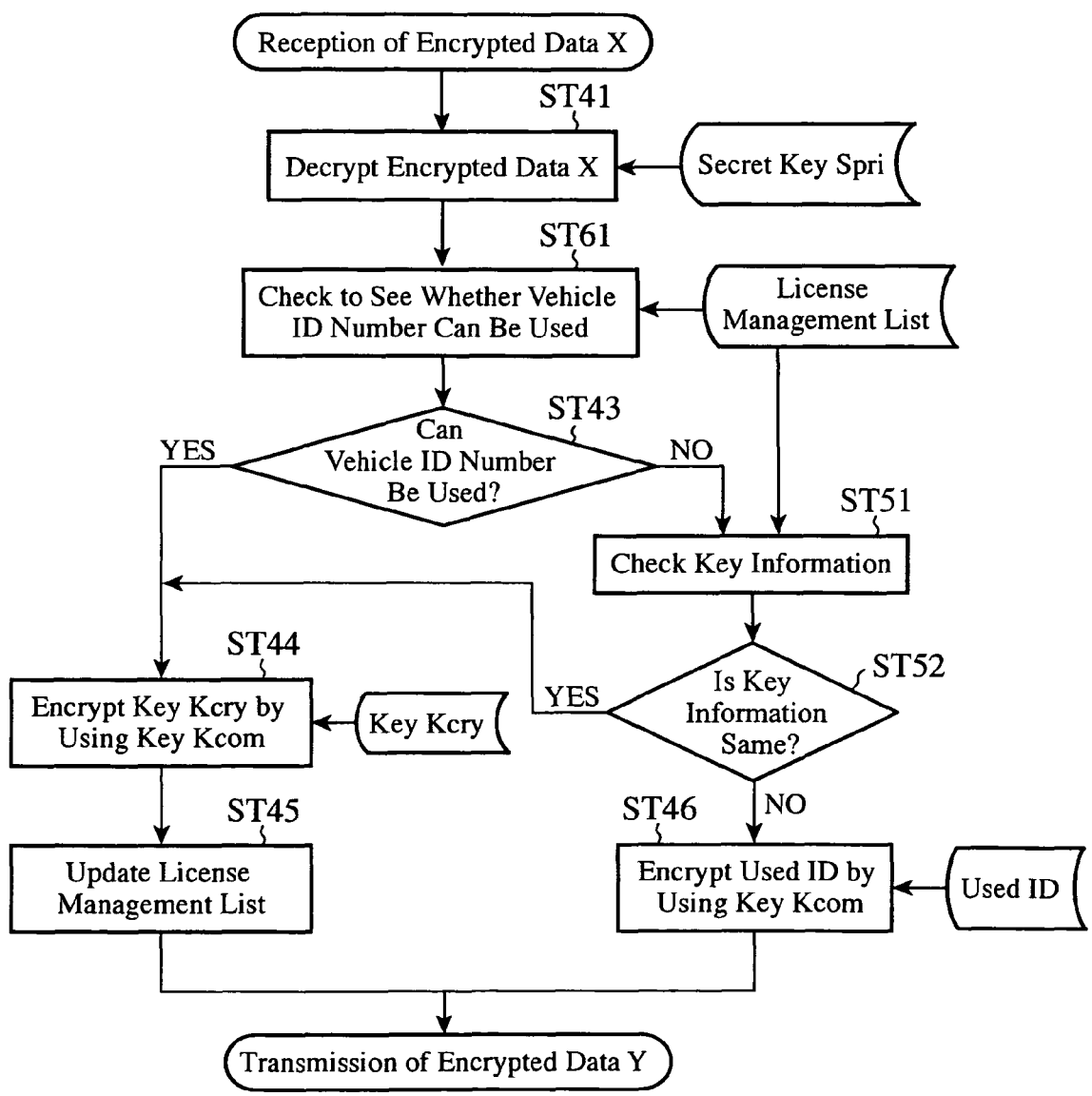
FIG. 13 is a flowchart showing the details of a license verification process which is carried out by the server which constructs the content distribution system in accordance with Embodiment 4 of the present invention.

Next, the operation of the content distribution system in accordance with Embodiment 4 of the present invention which is constructed as mentioned above will be explained. This content distribution system differs from that according to Embodiment 3 only in the license verification process (i.e., the process shown in step ST32 of FIG. 6) which is performed by the server 40. Therefore, the details of the license verification process will be explained with reference to a flow chart shown in FIG. 13. The steps in which the same processes as those of Embodiment 3 are preformed respectively are designated by the same numerals as those shown in Embodiment 3, and the explanation of the steps will be simplified.

In the license verification process, when the first encrypted data X are received as a license acquisition request, the first encrypted data X are decrypted first (step ST41). Whether or not the vehicle ID number can be used is then checked to see (step ST61). Whether the car navigation apparatus 10 which has the vehicle ID number acquired through the decrypting in step ST41 can use the DVD 1 is then checked to see (step ST43).

When it is, in this step ST43, judged that the DVD can be used, i.e., that the usable or unusable information is "0" (yet-to-be-used), the key Kcry is encrypted by using the key Kcom and the second encrypted data Y are generated (step ST44). The second encrypted data Y generated in this step ST44 are sent to the transmitting unit 48. An update of the license management list is then carried out (step ST45). Then, the license verification process by the server 40 is ended.

When it is, in above-mentioned step ST43, judged that the DVD cannot be used, i.e., that the usable or unusable information is "1" (already used), the key information is checked (step ST51). More specifically, the key encryption unit 47 acquires the key information from the license management list stored in the license management list storage-unit 45. Whether or not the key information is the same key is then checked to see (step ST52). More specifically, the key encryption unit 47 checks to see whether or not the key information acquired from the license management list storage unit 45 is the same as the key Kcom received from the car navigation apparatus 10.

When it is, in this step ST52, judged that they are the same as each other, the sequence advances to step ST44 in which the above-mentioned processing is performed. In contrast, when it is, in step ST52, judged that they are not the same as each other, the used ID is encrypted by using the key Kcom and the second encrypted data are generated (step ST46). The second encrypted data Y generated in this step ST46 are then sent to the transmitting unit 48.

As explained above, because the content distribution system in accordance with Embodiment 4 of the present invention is constructed in such a way as to record the key information into the server 40 while associating the key information with the license management list, the content distribution system can permit multiple times of distribution of the key when a license acquisition request is issued with the same key Kcom while the content distribution system provides the same advantages as those offered by Embodiment 3. As a result, when the data stored in the PC card 2 are erased accidentally or the PC card 2 is damaged in course of the process of distributing the key Kcry from the server 40 to the car navigation apparatus 10, the content distribution system can cause the car navigation apparatus 10 to transmit the first encrypted data X to the server 40 again and enable the car navigation apparatus 10 to receive distribution of the key Kcry from the server 40 again. In this case, when recording the first encrypted data X into the PC card 2 again, the car navigation apparatus 10 does not perform key generation newly, but uses the already-generated key Kcom.

Embodiment 5

A content distribution system in accordance with this Embodiment 5 is constructed in such a way as to use, as the owner ID, both the serial number provided to the DVD 1, and the vehicle ID number.

The content distribution system in accordance with this Embodiment 5 differs from the content distribution system in accordance with Embodiment 3 in the structure of the license management list stored in the license management list storage unit 45 of the server 40, the function of the ID encryption unit 162, which is included in the control unit 16 of the car navigation apparatus 10, and the operation of the server 40. Hereafter, the structure and the operation different from those of Embodiments 1 and 3 will be explained mainly.

FIG. 14 is a diagram showing the structure of the license management list stored in the license management list storage unit 45. This license management list is comprised of a vehicle ID number list shown in FIG. 14(a), and a serial number list shown in FIG. 14(b), and a correspondence management list shown in FIG. 14(c). The vehicle ID number list is constructed by adding an item about a vehicle ID number index (Index) to the license management list of Embodiment 3 shown in FIG. 10. The serial number list is constructed by adding an item about a serial number index (Index) to the license management list of Embodiment 1 shown in FIG. 5. The correspondence management list defines a correspondence between vehicle ID numbers and serial numbers with vehicle ID number indexes and serial number indexes. This correspondence management list has an initial value which is null.

The ID encryption unit 162 generates the first encrypted data X by encrypting both the vehicle ID number which is inputted, as the owner ID, from the input unit 15, the serial number, and the key Kcom sent from the key generation unit 161 by using the public key Spub stored in the public key storage unit 13, and sends the first encrypted data X to the PC card write unit 163.

Next, the operation of the content distribution system in accordance with Embodiment 5 of the present invention which is constructed as mentioned above will be explained. This content distribution system differs from those according to Embodiments 1 and 3 only in the process of generating the first encrypted data X which is performed by the car navigation apparatus 10 (step ST12 of FIG. 6), and the license verification process which is performed by the server 40 (the process shown in step ST32 of FIG. 6). Therefore, only the different processes will be explained.

In step ST12 shown in FIG. 6, when the vehicle ID number and the serial number are inputted from the input unit 15, the first encrypted data X are generated. More specifically, the ID encryption unit 162 generates the first encrypted data X by encrypting the vehicle ID number and the serial number which are inputted from the input unit 15, and the key Kcom sent from the key generation unit 161 by using the public key Spub stored in the public key storage unit 13, and sends the first encrypted data X to the PC card write unit 163. The subsequent processes are the same as those of Embodiments 1 and 3.

Figure 15:
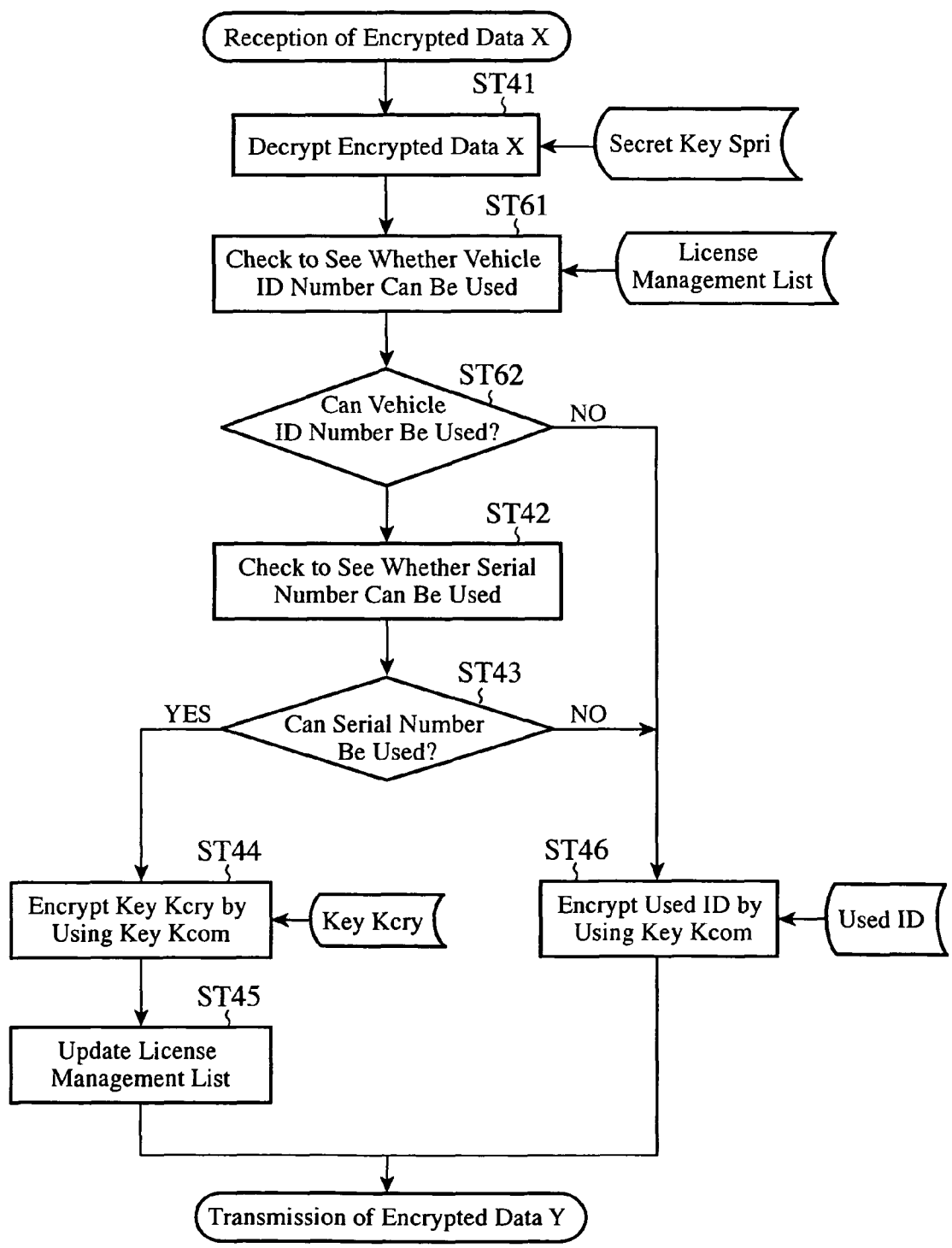
FIG. 15 is a flow chart showing the details of a license verification process which is carried out by the server which constructs the content distribution system in accordance with Embodiment 5 of the present invention.

Next, the details of the license verification process which is performed by the server 40 will be explained with reference to a flow chart shown in FIG. 15. The steps in which the same processes as those of Embodiment 1 are preformed respectively are designated by the same numerals as those shown in Embodiments 1 and 3, and the explanation of the steps will be simplified.

In the license verification process, when the first encrypted data X are received as a license acquisition request, the first encrypted data X are decrypted first (step ST41). Whether or not the vehicle ID number can be used is then checked to see (step ST61). More specifically, the key encryption unit 47 reads the vehicle ID number list of the license management list from the license management list storage unit 45 so as to acquire the usable or unusable information corresponding to the vehicle ID number acquired through the decrypting in step ST41. Whether the car navigation apparatus 10 which has the vehicle ID number acquired through the decrypting in step ST41 can use the DVD 1 is then checked to see (step ST43).

When it is, in this step ST43, judged that the DVD can be used, i.e., that the usable or unusable information is "0" (yet-to-be-used), whether or not the serial number can be used is then checked to see (step ST42). More specifically, the key encryption unit 47 reads the system number list of the license management list from the license management list storage unit 45 so as to acquire the usable or unusable information corresponding to the serial number acquired through the decrypting in step ST41. Whether or not the DVD 1 having the serial number which has been acquired through the decrypting in step ST41 can be used is then checked to see (step ST43). More specifically, the key encryption unit 47 checks to see whether the usable or unusable information which the key encryption unit has acquired in step ST42 is "0" or "1".

When it is, in this step ST43, judged that the DVD can be used, i.e., that the usable or unusable information is "0", the key Kcry is encrypted by using the key Kcom and the second encrypted data Y are generated (step ST44). The second encrypted data Y generated in this step ST44 are sent to the transmitting unit 48. An update of the license management list is then carried out (step ST45). More specifically, the key encryption unit 47 sets the usable or unusable information of the vehicle ID number list included in the license management list acquired in step ST61 to "1" and also sets the usable or unusable information of the license management list acquired in step ST42 to "1" and further sets up a correspondence between the vehicle ID index and the serial number index in the correspondence management list, and stores them in the license management list storage unit 45. Then, the license verification process by the server 40 is ended.

When it is, in above-mentioned steps ST43 and ST61, judged that the DVD cannot be used, i.e., that the usable or unusable information is "1" (already used), the used ID is encrypted using the key Kcom and the second encrypted data are generated (step ST46). The second encrypted data Y generated in this step ST46 are sent to the transmitting unit 48.

As explained above, because the server 40 can store the information about the DVD 1 which is used by each vehicle in the correspondence management list, the content distribution system in accordance with Embodiment 5 of the present invention can manage both the vehicle and the DVD1 while providing the same advantages as those offered by the content distribution systems in accordance with above-mentioned Embodiments 1 and 3.

Embodiment 6

A content distribution system in accordance with Embodiment 6 of the present invention is modified from the content distribution system in accordance with Embodiment 5 in such a way that the content distribution system of this Embodiment 6 can carry out distribution of the key Kcry a number of times.

The content distribution system in accordance with this Embodiment 6 is the same as the content distribution system in accordance with Embodiment 5 except for the structure of the license management list stored in the license management list storage unit 45 of the server 40, and the operation of the server 40. Hereafter, the structure and the operation different from those of Embodiment 5 will be explained mainly.

FIG. 16 is a diagram showing the structure of the license management list stored in the license management list storage unit 45. This license management list is constructed in such a way that an item called "key information" is added to the correspondence management list of the license management list in accordance with Embodiment 5 shown in FIG. 14. As the key information, the key Kcom generated by the car navigation apparatus 10 is used.

Figure 17:
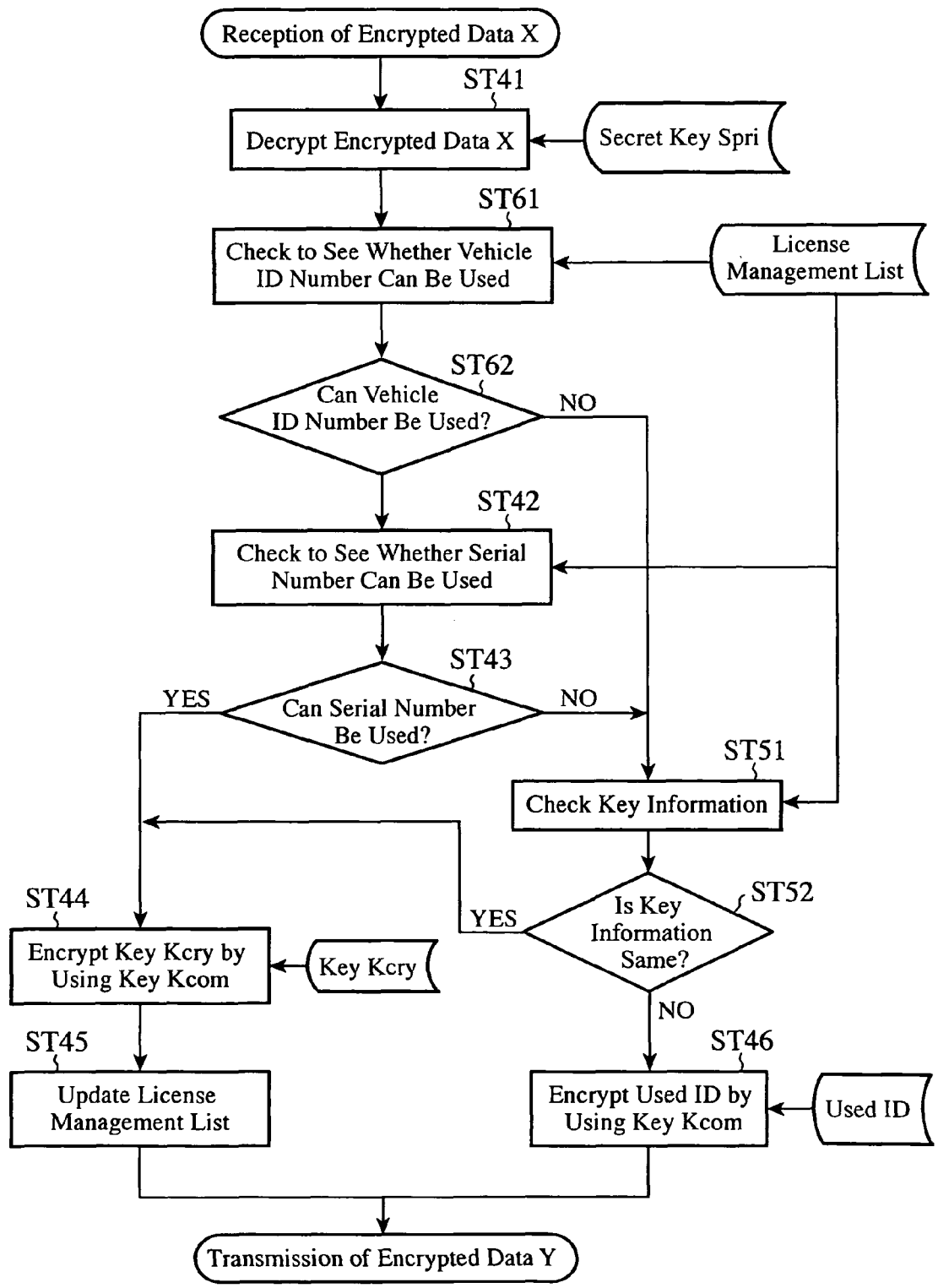
FIG. 17 is a flowchart showing the details of a license verification process which is carried out by the server which constructs the content distribution system in accordance with Embodiment 7 of the present invention.

Next, the operation of the content distribution system in accordance with Embodiment 6 of the present invention which is constructed as mentioned above will be explained. This content distribution system differs from that according to Embodiment 5 only in the license verification process (i.e., the process shown in step ST32 of FIG. 6) which is performed by the server 40. Therefore, the details of the license verification process will be explained with reference to a flow chart shown in FIG. 17. The steps in which the same processes as those of Embodiment 5 are preformed respectively are designated by the same numerals as those shown in Embodiment 5, and the explanation of the steps will be simplified.

In the license verification process, when the first encrypted data X are received as a license acquisition request, the first encrypted data X are decrypted first (step ST41). Whether or not the vehicle ID number can be used is then checked to see (step ST61). Whether the car navigation apparatus 10 which has the vehicle ID number acquired through the decrypting in step ST41 can use the DVD 1 is then checked to see (step ST43).

When it is, in this step ST43, judged that the DVD can be used, i.e., that the usable or unusable information is "0" (yet-to-be-used), whether or not the serial number can be used is then checked to see (step ST61). Whether the car navigation apparatus 10 which has the vehicle ID number acquired through the decrypting in step ST41 can use the DVD 1 is then checked to see (step ST43). When it is, in this step ST43, judged that the DVD can be used, i.e., that the usable or unusable information is "0" (yet-to-be-used), the key Kcry is encrypted by using the key Kcom and the second encrypted data Y are generated (step ST44). The second encrypted data Y generated in this step ST44 are sent to the transmitting unit 48.

An update of the license management list is then carried out (step ST45). More specifically, the key encryption unit 47 sets the usable or unusable information of the vehicle ID number list included in the license management list acquired in step ST61 to "1" and also sets the usable or unusable information of the license management list acquired in step ST42 to "1" and further sets up a correspondence between the vehicle ID index and the serial number index in the correspondence management list, and also stores, as the key information, the value of the key Kcom in the correspondence management list. Then, the license verification process by the server 40 is ended.

When it is, in above-mentioned step ST43 or ST61, judged that the DVD cannot be used, i.e., that the usable or unusable information of either the vehicle ID number list or the serial number list is "1" (already used), the key information is checked (step ST51). More specifically, the key encryption unit 47 acquires the key information from the correspondence management list of the license management list stored in the license management list storage unit 45. Whether or not the key information is the same key is then checked to see (step ST52). More specifically, the key encryption unit 47 checks to see whether or not the key information acquired from the correspondence management list of the license management list storage unit 45 is the same as the key Kcom received from the car navigation apparatus 10.

When it is, in this step ST52, judged that they are the same as each other, the sequence advances to step ST44 in which the above-mentioned processing is performed. In contrast, when it is, in step ST52, judged that they are not the same as each other, the used ID is encrypted by using the key Kcom and the second encrypted data are generated (step ST46). The second encrypted data Y generated in this step ST46 are then sent to the transmitting unit 48.

As explained above, the content distribution system in accordance with Embodiment 6 of the present invention, while providing the same advantages as those offered by the content distribution system in accordance with above-mentioned Embodiment 5, can accept a request to reissue a license from an authorized user.

In above-mentioned Embodiments 1 to 6, the user operates the car navigation apparatus 10 to update the map data, as previously explained. As an alternative, the content distribution system can be constructed in such a manner that a person who has special authority, for example, only a manager in a dealer is allowed to update the map data only through a manager setting screen of the car navigation apparatus 10. According to this structure, because the user does not need to perform any operation of updating the map data by himself or herself, the workload for the user is lightened. Because the user cannot participate in the update operation, the user can be prevented from performing unauthorized actions.

The DVD 1 is used as the first recording medium, though, as the first recording medium, instead of the DVD 1, another recording medium, such as a USB memory, a PC card, or an SD card, can be used. In other words, any type of device can be used as the first recording medium as long as the device is the one from which the car navigation apparatus 10 can read data.

The PC card 2 is used as the second recording medium, though, as the second recording medium, another recording medium which can be carried, such as a USB memory, an SD card, or a DVD, can be used instead of the PC card 2. In other words, any type of device can be used as the second recording medium as long as the device is the one in and from which both the car navigation apparatus 10 and the personal computer 20 can write and read data.

Although the DVD 1 is used as the first recording medium and the PC card 2 is used as the second storage medium, an identical recording medium can be used as them. Thereby, the server 40 can issue a license and can also issue content data.

An organization which generates the key Kcry for encryption of the map update data which are to be written into the DVD 1, an organization which manages the server 40, and an organization which generates the secret key which is to be sent to the server 40 and the public key which is to be stored in the car navigation apparatus 10 do not need to be the same. In other words, the server 40 has only to be able to distribute the key Kcry to the car navigation apparatus 10 through the above-mentioned processing.

The key Kcry used for encrypting the map update data which are to be written in the DVD 1 is generated by either the automaker of the vehicle or the maker of the car navigation apparatus 10. As an alternative, the key Kcry can be generated by the server 40. In this case, the key Kcry is sent from the server 40 to the organization which generates the encrypted map update data which are to be written in the DVD 1. Thereby, because the key Kcry does not need to be sent to the server 40, the risk of leakage of the key can be reduced. As an alternative, another organization can generate the key Kcry, and can also send it to both the organization which generates the encrypted map update data which are to be written in the DVD 1 and the server 40. In other words, the server 40 has only to hold the key Kcry used for decrypting the encrypted map update data finally written in the DVD 1.

Because the generation of the secret key Spri and the public key Spub is performed by either the automaker of the vehicle or the maker of the car navigation apparatus 10, it becomes unnecessary to carry out the public key Spub from the maker, thereby reducing the risk of leakage of the key. The server 40 can perform the generation of the secret key Spri and the public key Spub. In this case, the public key Spub is sent from the server 40 to either the automaker of the vehicle or the maker of the car navigation apparatus 10. As a result, because it is not necessary to carry out the secret key Spri from the server 40, the risk of leakage of the key can be reduced.

Furthermore, the server 40 can be constructed in such a way as to erase the first encrypted data X stored in the PC card 2 after reading the first encrypted data X from the PC card 2. In this case, the transmitting unit 48 of the server 40 sends an erase command to the communication apparatus 20 after the first encrypted data are decrypted by the ID decryption unit 44. The control unit 23 of the communication apparatus 20 erases the contents stored in the PC card 2 mounted to the PC slot 21 according to the erase command sent, via the communication unit 22, from the server 40. With this structure, unnecessary outflows of data used for the acquisition of the license can be prevented.

In addition, the car navigation apparatus 10 can be constructed in such a way as to erase the second encrypted data Y stored in the PC card 2 after reading the second encrypted data Y from the PC card 2. In this case, after completing the reading of the second encrypted data Y, the PC card read unit 164 notifies the PC card write unit 163 of the completion. The PC card write unit 163 erases the second encrypted data Y stored in the PC card in response to this notification. With this structure, unnecessary outflows of the data used for the acquisition of the license can be prevented.

Furthermore, the car navigation apparatus 10 can be constructed in such a way as to erase the key Kcry after receiving the key Kcry from the server 40 and then decrypting the encrypted map update data stored in the DVD 1. With this structure, the risk of leakage of the key Kcry to outside the system can be reduced.

In addition, the pair of the secret key Spri stored in the server 40 and the public key Spub stored in the car navigation apparatus 10 is not limited to only one set, and different pairs can be provided for either different types of vehicles or different types of car navigation apparatuses 10, respectively. In this case, information showing either the type of the vehicle or the type of the car navigation apparatus 10 is included in the first encrypted data X which are generated by the car navigation apparatus 10. With this structure, the risk in the event of leakage of the public key Spub to outside the system can be reduced.

Furthermore, the key Kcry used for the encryption of the map update data which are to be written in the DVD 1 is not limited to an only type of key, and a different type of key can be provided for every production month or for every production piece. In this case, information about a correspondence between the serial number or the vehicle ID number and the key Kcry is held by the server 40. With this structure, the risk in the event of leakage of the public key Spub to outside the system can be reduced.

The car navigation apparatus 10 is constructed in such a way that the key generation unit 161 generates the key Kcom. As an alternative, the car navigation apparatus can be constructed in such a way as to generate the pair of the public key Spub and the secret key Spri. In this case, instead of the key Kcom, the public key Spub is included in the first encrypted data X which are generated by the car navigation apparatus 10, and the second encrypted data Y read from the PC card 2 are decrypted by using the secret key Spri generated by the car navigation apparatus 10. With this structure, even in the event that the public key Spub which the car navigation apparatus 10 generates is leaked out of the PC card 2, because the second encrypted data Y cannot be decrypted by using the public key Spub which has been leaked out, the risk at the time of leakage of the public key Spub to outside the system can be reduced.

In above-mentioned Embodiments, 4, and 6, when recording the first encrypted data X into the PC card 2 again, the content distribution system does not perform key generation newly, but uses the already-generated key Kcom. In this case, instead of erasing this key Kcom after decrypting the encrypted map update data, the content distribution system can erase the key Kcom at the time when the update of the map data is completed. According to this structure, even in a case in which an error occurs during the map update process and the map update process cannot continue to be carried out, the license can be reissued.

In above-mentioned Embodiments 1 to 6, the case in which the car navigation apparatus is used as the terminal of the present invention is explained. The terminal of the present invention is not limited to the car navigation apparatus, and, for example, one of various types of equipment, such as a mobile phone, a PDA (Personal Digital Assistant), or portable audio equipment, which works in response to distribution of a content can be used.

In above-mentioned Embodiments 1 to 6, the content distribution system is constructed in such a way that transmission and reception of information are carried out between the car navigation apparatus 10 which does not have any communication function and the server 40 via the PC card 2. As an alternative, the content distribution system can be constructed in such a way that information transmitted and received via the PC card 2 is transmitted and received directly via communications between the car navigation apparatus 10 and the server 40.

In above-mentioned Embodiments 1 to 6, a public key encryption system which uses a secret key and a public key for encryption and decryption of encrypted data X is adopted. As an alternative, a common key encryption system which uses an identical key for encryption and decryption of encrypted data X can be adopted.

In above-mentioned Embodiments 1 to 6, a common key encryption system which uses an identical key Kcry as a content encryption key and a content decryption key is adopted. As an alternative, a public key encryption system which uses different keys as the content encryption key and the content decryption key can be adopted.

Industrial Applicability

As mentioned above, the content distribution system, the terminal, and the server in accordance with the present invention are suitable for use in, for example, a car navigation apparatus, a mobile phone, a PDA, and a terminal which do not have any communication function because the server can safely distribute a content decryption key even to a terminal which cannot establish any connection with the network.

The invention claimed is:

1. A content distribution system provided with a first recording medium in which a content encrypted by using a content encryption key is stored, comprising:
   a terminal to and from which a carryable second recording medium can be attached and detached, said terminal having no communication function outside of using said second recording medium, said terminal comprising:
      a key generation unit for generating a communication key,
      a public key storage unit for storing a public key which pairs up with a secret key stored in said server,
      an ID encryption unit for encrypting both an owner ID which said terminal has and the communication key generated by said key generation unit by using the public key stored in said public key storage unit so as to generate first encrypted data,
      a write unit for, when said second recording medium is mounted to said terminal, writing the first encrypted data generated by said ID encryption unit in said second recording medium, wherein the write unit erases contents stored in the second recording medium after the content currently recorded in said first recording medium is decrypted by the content decryption unit,
      a read unit for, when the second recording medium is re-mounted to said terminal after having written therein second encrypted data, reading the second encrypted data from said second recording medium,
      a key decryption unit for decrypting the second encrypted data read by said read unit by using the communication key generated by said key generation unit, and
      a content decrypting unit for, when said first recording medium is mounted to said terminal, decrypting content stored in said first recording medium by using a content decryption key which said key decryption unit acquires by decrypting the second encrypted data;
   a communication apparatus to and from which said second recording medium can be attached and detached, said communication apparatus comprising:
      a control unit for reading the first encrypted data from said second recording medium in response to mounting of said second recording medium in which the first encrypted data are written by said terminal to said communication apparatus, and then transmitting the first encrypted data to said server so as to make a request for acquisition of a license, and for receiving the second encrypted data transmitted from said server in response to said license acquisition request and then writing the second encrypted data in said second recording medium as mounted to said communication apparatus; and a server connected to said communication apparatus via a network, comprising:
- a secret key storage unit for storing the secret key which pairs up with the public key stored in said terminal;
- a key storage unit for storing the content decryption key;
- a receiving unit for receiving the first encrypted data which are transmitted, as the license acquisition request, from said communication apparatus via the network;
- an ID decryption unit for decrypting the first encrypted data received by said receiving unit by using the secret key stored in said secret key storage unit;
- a key encryption unit for encrypting the content decryption key stored in said key storage unit by using the communication key which said ID decryption unit acquires by decrypting the first encrypted data so as to generate the second encrypted data; and
- a transmitting unit for transmitting the second encrypted data generated by said key encryption unit to said communication apparatus as a response to said license acquisition request.

2. The terminal according to claim 1, wherein the owner ID is an ID provided to the first recording medium.

3. The terminal according to claim 1, wherein the owner ID is an ID provided to said terminal.

4. The terminal according to claim 1, wherein the owner ID is comprised of an ID provided to the first recording medium and an ID provided to said terminal.

5. The terminal according to claim 1, wherein said terminal comprises a key storage unit for storing the communication key generated by the key generation unit, and said key decryption unit decrypts the second encrypted data read by the read unit by using the communication key stored in said key storage unit and said content decryption unit erases contents stored in said key storage unit after decrypting the content.

6. The server according to claim 1, wherein the transmitting unit transmits an erase command to the communication apparatus so as to cause said communication apparatus to erase the first encrypted data written into the second recording medium mounted to said communication apparatus after the first encrypted data are decrypted by the ID decryption unit, and, after that, transmits the second encrypted data generated by the key encryption unit to said communication apparatus so as to cause said communication apparatus to write the second encrypted data in the second recording medium mounted to said communication apparatus.

7. The server according to claim 1, wherein said server comprises an ID storage unit for storing an owner ID of an owner of the terminal, information indicating whether or not this owner ID can be used, and the communication key, and, when an owner ID and a communication key which the ID decryption unit acquires by decrypting the first encrypted data match with the owner ID and the communication key which are stored in said ID storage unit, respectively, or when the information stored in said ID storage unit and indicating whether or not said owner ID can be used indicating that the owner ID which the ID decryption unit acquires by decrypting the first encrypted data can be used, the key encryption unit encrypts the content decryption key stored in the key storage unit by using said communication key so as to generate the second encrypted data.

8. The server according to claim 7, wherein the owner ID is an ID provided to the first recording medium.

9. The server according to claim 7, wherein the owner ID is an ID provided to said terminal.

10. The server according to claim 7, wherein the owner ID is comprised of an ID provided to the first recording medium and an ID provided to said terminal.

11. The server according to claim 7, wherein the key storage unit stores a plurality of content decryption keys, and the key encryption unit selects either of the plurality of content decryption keys stored in said key storage unit according to either the owner ID or the communication key which the ID decryption unit acquires by decrypting the first encrypted data, and encrypts said selected content decryption key by using the communication key.

* * * * *